United States Patent

[11] 3,600,941

| [72] | Inventor | John H. Kammeraad<br>Holland, Mich. |
|---|---|---|
| [21] | Appl. No. | 888,234 |
| [22] | Filed | Dec. 29, 1969 |
| [45] | Patented | Aug. 24, 1971 |
| [73] | Assignee | K-Line Tool Co.<br>Holland, Mich. |

[54] COMPRESSION TESTER
11 Claims, 6 Drawing Figs.

[52] U.S. Cl. .................................................. 73/115,
73/420, 141/367, 285/12
[51] Int. Cl. .................................................. G01m 15/00,
G01l 7/00
[50] Field of Search........................................ 73/420,
116, 115, 49.7; 137/235.5; 285/12, 177; 141/367;
116/124.11; 237/234.5

[56] References Cited
UNITED STATES PATENTS

| 969,358 | 9/1910 | Goodall | 285/177 X |
| 1,244,925 | 10/1917 | Wahl | 285/12 |
| 1,657,047 | 1/1928 | St. John | 73/420 |
| 3,052,257 | 9/1962 | Bartlett | 285/177 X |
| 3,100,988 | 8/1963 | Mansfield | 73/116 |
| 3,224,260 | 12/1965 | Lankford | 73/420 |

*Primary Examiner*—Louis R. Prince
*Assistant Examiner*—Daniel M. Yasich
*Attorney*—Price, Heneveld, Huizenga & Cooper

ABSTRACT: An improved compression tester and novel fittings therefor, the hose of the tester being provided with a nipple concentrically threaded both internally and externally, the internal threads engaging a check valve independent of the mounting of the fittings on the external threads. The two fittings are reversible, both ends of at least one of the fittings being externally threaded for a distance along the length of the fitting, the distance differing for the two ends. The internal threading by which both fittings threadably engage the nipple of the base is along the center portion only of the bore.

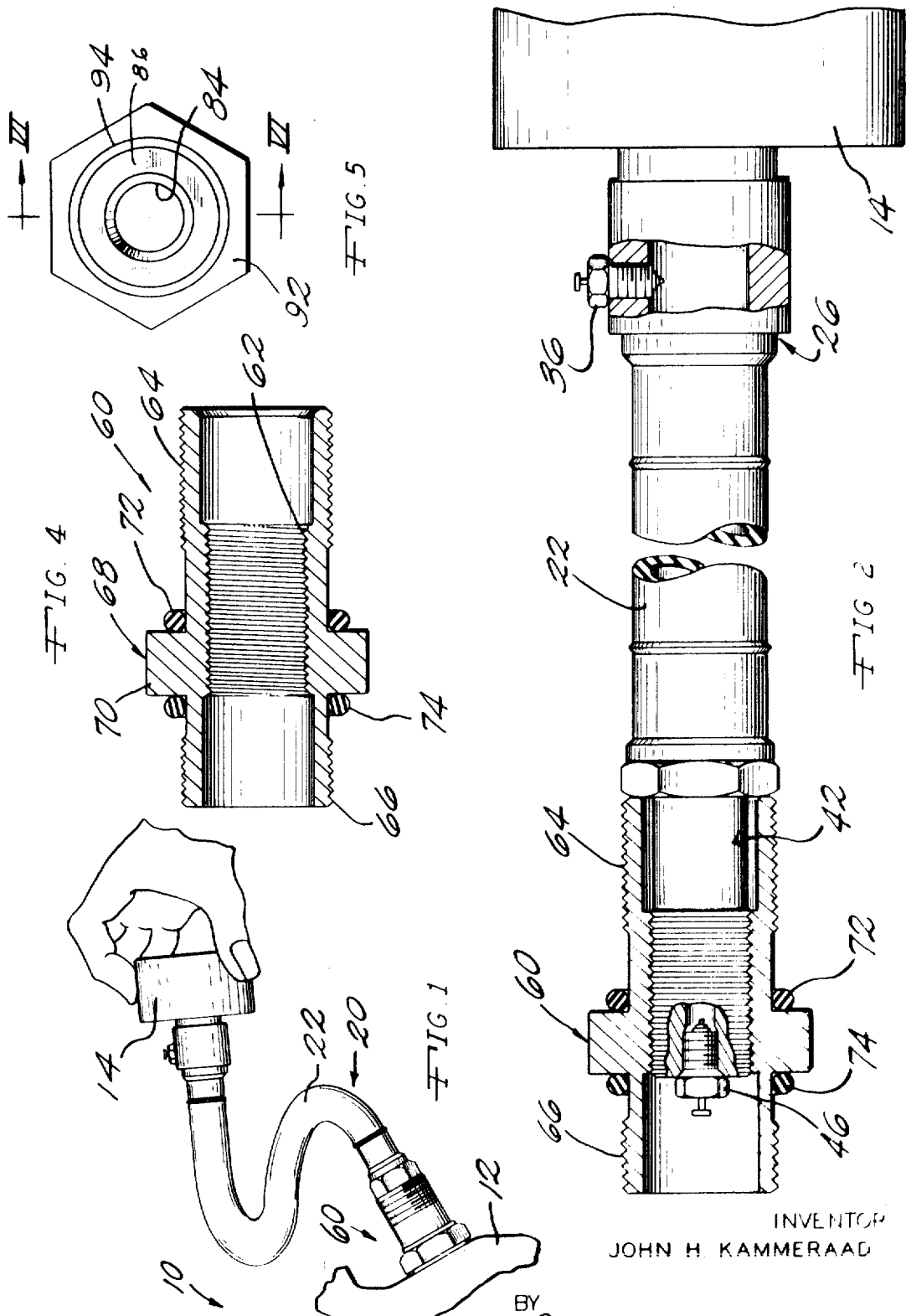

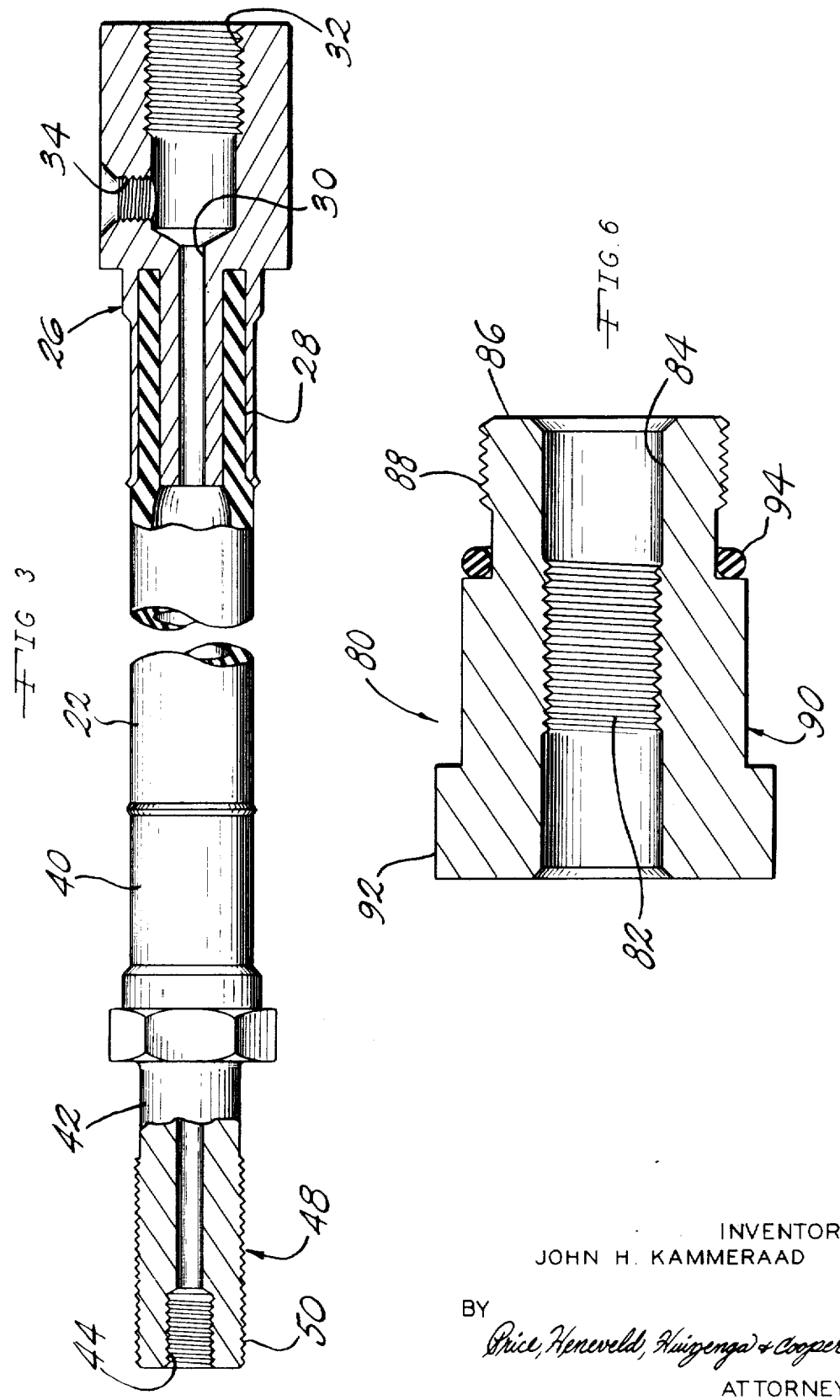

3,600,941

COMPRESSION TESTER

BACKGROUND OF INVENTION

In internal combustion engines, it is periodically necessary to check the compression generated within the cylinders. Devices have been developed for reading the compression by means of a gauge flexibly connected to the cylinder through the spark plug hole, the device comprising the gauge, a fitting of some type mounted within the spark plug hole and a flexible hose connecting the gauge to the fitting. In some cases, the flexible hose is utilized as a torque transmitter to turn the fitting into the spark plug hole. See, for example, U.S. Pat. No. 3,244,260.

Problems have arisen concerning the fittings utilized on the previous compression testers, particularly when the fittings have been designed to accommodate different-sized spark plug holes. That is, there are basically two sizes of spark plug holes, 14 millimeters and 18 millimeters. Fittings designed to accommodate both sizes by positioning the larger size immediately in back of the smaller size require that the smaller size portion of the fitting run into the cylinder head a considerable distance before the larger size screw threads seal the spark plug opening. In many cases, there is not enough runout room for the smaller end. Attempts to reduce the length of the smaller portion of the fitting to prevent the difficulties just described often result in a 14-millimeter threaded section which is too short to seal the fitting to the 14-millimeter spark plug holes in all cases. Also, a fitting having a single length of 14-millimeter threads by itself does not satisfactorily meet the requirements for all 14-millimeter-sized spark plug holes due to the sealing problem. That is, to extend the 14-millimeter-sized threads a sufficient length to insure sealing in all spark plug openings results, in the case of some 14-millimeter-sized openings, in a lack of runout room before the sealing is completed.

Still another problem with previous compression testers is the fact that the check valve is mounted within the fitting, so that when a fitting is removed from the hose both the fitting and the check valve are subject to being misplaced or dropped, the latter condition being one which is capable of damaging the check valve.

SUMMARY OF THE INVENTION

This invention relates to an improved compression tester based upon the discovery that essentially three different types of fitting ends are needed to meet the requirements of most automobiles namely a fitting with a 14-millimeter-sized threaded end having a long run, a 14-millimeter-sized threaded end having a short run, and an 18-millimeter-sized threaded end. It has been further discovered that two of these can be mounted on one fitting, thus reducing the number of fittings needed, while at the same time the check valve can be removed from the fitting and placed on the hose so as to avoid the problem set forth in the previous paragraph. This is accomplished by threadably engaging the fitting and the hose so as to accommodate the fitting on the hose in either of two orientations, one of which allows one end of the fitting to engage the spark plug holes and the other of which allows the opposite end of the fitting to engage other spark plug holes. This is generally accomplished by internally threading the bore of the fitting to accommodate an externally threaded nipple on the hose, the nipple being internally threaded to receive the check valve therein rather than in the fitting. The fitting which is utilized in either of two orientations can thus have two of the three threaded sections on two opposite ends, while a second fitting provides the third.

It is another object of the invention to provide an improved tester of the above character wherein a two-way fitting can be reversibly positioned on the hose to accommodate most spark plug holes.

It is a related object of the invention to provide an improved tester of the above character wherein the check valve is mounted independently from and not removed with the fitting.

It is still another object of the invention to provide novel fittings for use with the improved tester of the invention.

Other objects and advantages will become apparent upon reference to the following drawings and detailed discussions.

BRIEF DESCRIPTION OF THE DRAWINGS

FIG. 1 is an elevational view, partially schematic, illustrating the use of the compression tester of the invention;

FIG. 2 is a fragmentary elevational view, partially in section, illustrating the compression tester of the invention in its assembled form with one of the fittings engaging the hose;

FIG. 3 is a fragmentary elevational view, partially in section, illustrating the hose of the assembly shown in FIG. 2;

FIG. 4 is a longitudinal sectional view of the fitting shown in FIG. 2;

FIG. 5 is an end elevational view of a second fitting utilized in the invention; and FIG. 6 is a sectional view taken along the line of VI—VI of FIG. 5.

DESCRIPTION OF THE PREFERRED EMBODIMENT

The invention provides an improved compression tester and novel fittings therefor, for testing the compression of the cylinders in an engine 10. As shown in FIG. 1, the tester 20 conventionally screws into the spark plug holes of the cylinder head 12 of the internal combustion engine so that the fitting on the tester seats therein. Rotary motion is transmitted to the fitting via the hose 22 in conventional fashion. A conventional gauge 14 is attached to one extremity of hose 22 and one of the fittings 60 or 80 to the other extremity thereof.

THE HOSE

Referring to FIG. 3, the hose comprises a flexible hollow tube formed from a number of layers of material and woven wire in a conventional fashion. At each end of the hose 22, an adapter 26 and 40 is provided. The adapter 26 conventionally crimps onto the end of the hose 22 by means of the groove 28 spaced from the passageway 30 within the adapter 26. The adapter 26 is internally threaded at 32 to accommodate to gauge 14 and at opening 34 in the side thereof to accommodate a check valve 36 (see FIG. 2).

The adapter 40 is crimped onto the opposite end of the hose 22 and has provided as an integral part thereof a nipple 42 the bore of which is internally threaded at the end 44 to accommodate another check valve 46 (see FIG. 2). The external surface 48 of the nipple is threaded at 50 to accommodate the fittings of the invention as hereinafter described.

THE FITTINGS

Referring now to FIGS. 2 and 4, a fitting 60 is provided for both engaging the nipple 42 and for threading into the spark plug holes of the cylinder heads 12. The fitting 60 is a hollow cylindrical body the bore of which is threaded at portion 62. The threaded portion 62 extends at least along the approximate center portion of the fitting bore. Externally, the fitting 60 is threaded at both of its ends 64 and 66, the threads for the ends 64 and 66 extending only a portion of the length of the fitting 60. Specifically, the thread for the end 66 does not extend as far as the thread for the end 64. A nonthreaded section or portion 68 of the external length of the fitting 60 is positioned between the threaded ends 64 and 66, the section 68 specifically including a shoulder 70 having external dimensions which exceed that of the threaded ends 64 and 66. By "external dimensions" as used in this application, it is meant the diameter of the shoulder, whichever way it is measured. Thus, if the shoulder is conventionally hexagonal, then it is the diameter whether measured from corner to corner or side to side.

3

The shoulder 70, in conjunction with seals 72 and 74, functions to seal the airpath from the cylinder to the gauge when the fitting and the hose are screwed down into the spark plug hole as will be readily appreciated by those skilled in the art. The seals 72 and 74 can be conventional O-rings.

It will be noted that the external diameters of the ends 64 and 66 are identical. The purpose of providing the two different ends is to permit pressure measurements to be taken in engines where the shorter end 66 will not seal the spark plug hole. In that case, the longer threaded end 64 is utilized. Conversely, if the longer threaded end 64 does not encounter enough runout in the cylinder head to seal, then the fitting is reversed to the orientation shown in FIG. 2 whereby the shorter threaded end 66 is utilized to seal the fitting to the spark plug hole. As shown in FIG. 4, the diameter of the ends 64 and 66 is 14 millimeters to accommodate most usually encountered engines.

FIGS. 5 and 6 illustrate the second of the two fittings provided by the invention, the fitting 80 providing the remaining third threaded diameter necessary to accommodate the usually encountered spark plug holes. As in the case with the fitting 60, the fitting 80 is internally threaded at 82 for at least the approximate center portion of the bore 84, the thread 82 preferably not extending to the ends. The end 86 of the fitting 80 is threaded at 88, the diameter of the threaded portion being 18 millimeters in conventional cases. A shoulder 90 is provided spaced away from the threaded end 88, the shoulder 90 terminating in the end 92 of the fitting which can be formed with a conventional hexagonal head. An O-ring 94 is utilized to seal the shoulder 90 against the external surface of the cylinder head of the engine when the threaded section 88 is screwed into the spark plug hole.

It will be recognized that the threaded portion 82 of the bore has the same diameter as the corresponding portions of the fitting 60, so that both fittings 60 and 80 fit onto the same hose of the compression tester.

ASSEMBLY

Referring now particularly to FIGS. 2 and 3, the fittings 60 and 80 are threaded onto the external surface 48 of the nipple 42. Both fittings can be screwed onto the nipple from either end in view of the fact that the fittings are internally threaded and the check valve 46 is mounted internally within the nipple 42. Because the threaded portions 62 and 82 of the fittings only extend through the approximate center portion of the bore, the amount of threading necessary to completely attach the fittings 60 and 80 to the nipple 42 is minimized. Because fitting 60 can be reoriented so as to position either of its ends exposed to the spark plug hole, it is possible to remount the fitting if the end initially exposed does not completely seal within the spark plug hole. Thus, while the end 66 is exposed to the spark plug hole when the fitting 60 is mounted on the nipple 42 as shown in FIG. 2, if the end 66 is not long enough to seal a particular spark plug hole, the fitting 60 can be removed and reversed so as to reorient it with the end 64 exposed to the spark plug hole. Alternatively, if the spark plug hole is of a different diameter than the external diameter of the ends 64 and 66, such as 18 millimeters, then the fitting 60 can be removed and the fitting 80 positioned on the nipple. As will be readily appreciated, it is not necessary to reverse the orientation of the fitting 80 on the nipple inasmuch as only one threaded end for the spark plug hole engagement is provided on that fitting.

It will also be appreciated that inasmuch as the fittings 60 and 80 can be removed from the nipple 42 without affecting the mounting of the check valve 46 therein, there will be no likelihood or possibility of misplacing or dropping the check valve 46, even if that does occur with the fitting which has been so removed. This construction permits, additionally, the use of multiple-sized fittings with a single check valve.

In connection with the assembly of the gauge 14 to the adapter 26 at the opposite end of the hose, it will be noted that the adapter 26 is one integral piece rather than a separate piece screwed into a sleeve clamped onto the hose. The valve 46 functions to permit the pressure within the hose to be retrieved.

Although the invention has been described in connection with preferred embodiments, it will be appreciated that equivalent structures will be readily available to one skilled in the art. For example, the fittings could be arranged so that the 18-millimeter threaded end is mounted in place of one of the 14-millimeter threaded ends 64 or 66. In that case, the fitting 80 would have at its threaded end 88 the millimeter size so replaced on the fitting 60. Such other embodiments which might be utilized to modify the disclosed invention to obtain the equivalent structure are to be deemed included within the scope of the following claims unless these claims, by their language, expressly state otherwise.

The embodiments of the invention in which an exclusive property or privilege is claimed are defined as follows:

1. In an apparatus particularly adapted for attachment to threaded openings in the cylinders of internal combustion engines, the apparatus including a flexible hose having an air passageway therethrough adapted to be coupled in air pressure communicating relationship with the interior of said cylinder, said hose having an air pressure device on one end thereof, the improvement comprising:

first threaded fastening means on the other end of said hose;

a first fitting having an air passageway therethrough, said fitting having threaded sections on either external extremity thereof sized so as to be threadably engageable with the threaded openings in different types of cylinders; and second threaded fastening means on said fitting for threadably engaging said first threaded fastening means in either of two orientations, one which orientation allows one end of said fitting to threadably engage the threaded opening in one type of cylinder and the other which orientation allows the other end of said fitting to threadably engage the threaded opening on another type of cylinder.

2. The improved tester as defined in claim 1, and further including a check valve positioned within the air passageway of said hose.

3. The improved apparatus as defined in claim 2 wherein said check valve is threadably secured within said first threaded fastening means.

4. The improved apparatus as defined in claim 1 wherein said first fastening means comprises an externally threaded nipple.

5. The apparatus as set forth in claim 4 wherein said second fastening means comprises an internal threaded portion within said fitting.

6. The improved tester as defined in claim 5, wherein said internally threaded portion extends only the length of the approximate center portion of said fitting so as to reduce the amount of screwing and unscrewing necessary to engage said hose with said fitting.

7. The improved apparatus as defined in claim 1 which further comprises a second fitting having an air passageway therethrough, the air passageway including an internal threaded portion adapted to be threadably secured to said nipple when said first fitting has been removed therefrom, said second fitting including an externally threaded portion at one end thereof sized so as to be threadably engageable with the threaded openings in yet another type of cylinder.

8. The improved apparatus as defined in claim 1 wherein said first fitting includes a shoulder section between said threaded sections, the external dimensions of said shoulder section exceeding the external dimensions of the adjacent threaded sections.

9. The improved apparatus as set forth in claim 8 which further comprises first seal means positioned adjacent one side of said shoulder section and second seal means positioned adjacent the opposite side of said shoulder section.

10. The improved apparatus as defined in claim 1 wherein one of said threaded sections on said first fitting extends for a greater length of said first fitting than the other threaded section on said first fitting.

11. The improved apparatus as defined in claim 1 wherein said air pressure device is a compression gauge.